(12) United States Patent
Wegner

(10) Patent No.: US 11,066,317 B1
(45) Date of Patent: Jul. 20, 2021

(54) SYSTEM FOR REMOVAL OF NITRATE AND CHROME FROM WATER

(71) Applicant: Paul Charles Wegner, San Carlos, CA (US)

(72) Inventor: Paul Charles Wegner, San Carlos, CA (US)

(*) Notice: Subject to any disclaimer, the term of this patent is extended or adjusted under 35 U.S.C. 154(b) by 0 days.

(21) Appl. No.: 16/663,813

(22) Filed: Oct. 25, 2019

Related U.S. Application Data

(60) Provisional application No. 62/766,558, filed on Oct. 26, 2018.

(51) Int. Cl.
  *B01D 61/02* (2006.01)
  *C02F 1/28* (2006.01)
  (Continued)

(52) U.S. Cl.
  CPC ............ *C02F 9/00* (2013.01); *B01D 61/027* (2013.01); *B01D 69/12* (2013.01); *B01D 71/56* (2013.01); *B01D 2311/25* (2013.01); *B01D 2311/2623* (2013.01); *B01D 2311/2626* (2013.01); *C02F 1/281* (2013.01); *C02F 1/42* (2013.01); *C02F 1/442* (2013.01); *C02F 2001/422* (2013.01); *C02F 2101/101* (2013.01); *C02F 2101/163* (2013.01); *C02F 2101/22* (2013.01); *C02F 2301/046* (2013.01); *C02F 2303/16* (2013.01)

(58) Field of Classification Search
  CPC . B01D 61/027; B01D 2311/2623; C02F 1/42; C02F 1/442; C02F 2001/422; C02F 2101/163; C02F 2101/22
  See application file for complete search history.

(56) References Cited

U.S. PATENT DOCUMENTS

| 1,646,270 A | 10/1927 | Apeldorn |
| 1,787,698 A * | 1/1931 | Montgomery ............ C02F 1/42 |
| | | 210/290 |

(Continued)

FOREIGN PATENT DOCUMENTS

| CA | 1188645 | 6/1985 |
| EP | 0050211 | 9/1981 |

(Continued)

OTHER PUBLICATIONS

Ozer, A. et al—A study on the Cr(VI) removal from aqueous solutions by steel wool—Environmental Pollution vol. 97 No. 1-2 pp. 107-112, 1997 (Year: 1997).*

(Continued)

*Primary Examiner* — Bradley R Spies
(74) *Attorney, Agent, or Firm* — Head, Johnson, Kachigian & Wilkinson, PC

(57) ABSTRACT

A process to remove nitrates and chrome from water. The process includes the steps of passing incoming nitrate and chrome contaminated water through a nanofiltration membrane. Retentate liquid rejected from the nanofiltration membrane is pumped to effluent or returned to the nanofiltration membrane. Permeate from the nanofiltration membrane is sprayed through a well screen upper collector above an open atmospheric bed having strong base ion exchange resin. The permeate is pumped through the ion exchange resin and through a gravel layer beneath the resin. The strong base ion exchange resin is periodically regenerated.

20 Claims, 16 Drawing Sheets

(51) Int. Cl.
  *C02F 1/42* (2006.01)
  *C02F 1/44* (2006.01)
  *C02F 101/16* (2006.01)
  *C02F 101/22* (2006.01)
  *C02F 9/00* (2006.01)
  *B01D 69/12* (2006.01)
  *B01D 71/56* (2006.01)
  *C02F 101/10* (2006.01)

(56) References Cited

U.S. PATENT DOCUMENTS

| | | | |
|---|---|---|---|
| 2,754,261 A | | 7/1956 | Akeroyd |
| 2,965,557 A | | 12/1960 | Price |
| 3,215,624 A | * | 11/1965 | Frazer ............... B01J 47/10 210/676 |
| 3,516,930 A | * | 6/1970 | Ross ............... C02F 1/283 210/694 |
| 3,553,098 A | | 1/1971 | Claridge et al. |
| 3,775,088 A | | 11/1973 | Higgins |
| 3,985,648 A | | 10/1976 | Casolo |
| 4,120,775 A | | 10/1978 | Murray et al. |
| 4,321,145 A | | 3/1982 | Carlson |
| 4,539,098 A | | 9/1985 | Yudovich |
| 4,737,267 A | | 4/1988 | Pao et al. |
| 4,806,244 A | * | 2/1989 | Guilhem ............ B01D 61/025 210/638 |
| 4,872,989 A | | 10/1989 | Pirotta |
| 5,055,201 A | | 10/1991 | Wegner |
| 5,078,900 A | | 1/1992 | Wegner |
| 5,095,926 A | | 3/1992 | Wegner |
| 5,273,647 A | | 12/1993 | Tuszko et al. |
| 5,348,588 A | | 9/1994 | Winston |
| 5,534,136 A | | 7/1996 | Rosenbloom |
| 5,658,459 A | * | 8/1997 | Guttormsen ......... B01D 24/14 210/279 |
| 5,772,127 A | | 6/1998 | Maciejewski et al. |
| 5,811,012 A | | 9/1998 | Tanabe et al. |
| 5,814,224 A | | 9/1998 | Khamizov et al. |
| 5,925,255 A | | 7/1999 | Mukhopadhyay |
| 5,997,745 A | | 12/1999 | Tonelli et al. |
| 5,998,640 A | | 12/1999 | Haefele et al. |
| 6,004,455 A | | 12/1999 | Rendall |
| 6,113,797 A | | 9/2000 | Al-Samadi |
| 6,247,480 B1 | | 6/2001 | Wegner |
| 6,267,891 B1 | | 7/2001 | Tonelli et al. |
| 6,346,195 B1 | | 2/2002 | Filson et al. |
| 7,108,792 B2 | | 9/2006 | Wegner |
| 7,399,366 B1 | | 7/2008 | Wegner et al. |
| 7,413,084 B2 | | 8/2008 | Wegner |
| 7,438,129 B2 | | 10/2008 | Heins |
| 7,439,054 B1 | | 10/2008 | Maga et al. |
| 7,562,664 B2 | | 7/2009 | Wegner et al. |
| 8,226,820 B1 | | 7/2012 | Wegner |
| 8,986,503 B2 | | 3/2015 | Kemp et al. |
| 9,670,075 B1 | | 6/2017 | Wegner |
| 10,252,921 B1 | | 4/2019 | Wegner |
| 10,604,424 B1 | | 3/2020 | Wegner |
| 10,683,223 B1 | | 6/2020 | Wegner |
| 2001/0004962 A1 | | 6/2001 | Hirota et al. |
| 2002/0056690 A1 | | 5/2002 | Wegner |
| 2002/0102229 A1 | | 8/2002 | Wegner |
| 2002/0153319 A1 | | 10/2002 | Mukhopadhyay |
| 2003/0151024 A1 | | 8/2003 | Wegner |
| 2003/0213367 A1 | * | 11/2003 | Kim ............... B01D 53/0446 96/134 |
| 2004/0050786 A1 | | 3/2004 | Dey et al. |
| 2004/0142834 A1 | | 7/2004 | Wegner |
| 2005/0065052 A1 | | 3/2005 | Wegner |
| 2005/0142096 A1 | | 6/2005 | Wegner |
| 2005/0189301 A1 | | 9/2005 | Wegner et al. |
| 2005/0194319 A1 | | 9/2005 | Wegner |
| 2005/0263740 A1 | | 12/2005 | Wegner |
| 2006/0081503 A1 | | 4/2006 | Wegner |
| 2007/0102359 A1 | | 5/2007 | Lombardi et al. |
| 2007/0114178 A1 | | 5/2007 | Coppola et al. |
| 2007/0131590 A1 | | 6/2007 | Bozak et al. |
| 2007/0205141 A1 | | 9/2007 | Freeman et al. |
| 2008/0060978 A1 | | 3/2008 | Wegner |
| 2008/0156732 A1 | | 7/2008 | Kearney et al. |
| 2008/0272037 A1 | | 11/2008 | Wegner et al. |
| 2008/0296232 A1 | | 12/2008 | Wegner |
| 2009/0057231 A1 | | 3/2009 | Schelhaas et al. |
| 2010/0147767 A1 | | 6/2010 | Grott |
| 2010/0163489 A1 | * | 7/2010 | Bauder ............... C02F 9/00 210/652 |
| 2010/0320155 A1 | | 12/2010 | Enos et al. |
| 2011/0000860 A1 | | 1/2011 | Bland et al. |
| 2014/0069821 A1 | | 3/2014 | Marcin et al. |
| 2015/0053620 A1 | | 2/2015 | Suri et al. |
| 2016/0040522 A1 | * | 2/2016 | Jacob ............... E21B 43/20 166/267 |
| 2016/0207797 A1 | * | 7/2016 | Boodoo ............ B01J 49/07 |

FOREIGN PATENT DOCUMENTS

| | | |
|---|---|---|
| EP | 0081016 | 12/1981 |
| WO | 9212896 | 7/1993 |
| WO | 9730010 | 8/1997 |

OTHER PUBLICATIONS

Nadav "Boron removal from seawater reverse osmosis permeate utilizing selective ion exchange resin", Desalination (1999), 124(1-3), 131-135. (Year: 1999).

Wilcox et al. "Boron removal from high-purity water by selective ion exchange", Ultrapure Water (2000), 17(6), 40, 42-43, 45-46, 48-51, (Year: 2000).

EPA, "Standard operating procedure for calibration and maintenance of pH meters," SOP No. EQ-01-07, Nov. 25, 2014.

DeSilva, Frank. Protecting ion exchange resins from suspended solids. Water Quality Products. Mar. 24, 2011. Available at <https://www.wqpmag.com/protecting-ion-exchange-resins-suspended-solids>, 2 pages. (Year: 2011).

Miller et al. Understanding ion-exchange resins for water treatment systems. General Electric Company. Jun. 2009, 13 pages. (Year: 2009).

Cheremisinoff, N.P. (2000). Handbook of Chemical Processing Equipment. Elsevier.

Svarovsky, L. (1990). Solid-Liquid Separations, 3rd ed., Butterworths.

U.S. Environmental Protection Agency; EPA-600/2-78-052; Jun. 1978; 310 Pages; Nitrate Removal From Water Supplies by Ion Exchange by Dennis A. Clifford and Walter J. Neber, Jr., of The University of Michigan, Ann Arbor, Michigan 48109; Grant No. R-803898; Project Officer Thomas J. Sort, Water Supply Research Division U.S. EPA, Cincinnati, OH 45268.

Trademark of The Dow Chemical Company ("Dow") or an affiliated company of Dow; Form No. 609-00519-1206 Filmtec Membranes Filmtec NF270 Nanofiltration Elements for Commercial Systems 2 Pages.

* cited by examiner

SYSTEM FOR REMOVAL OF NITRATE AND CHROME FROM WATER

CROSS-REFERENCE

This application is based on and claims priority to U.S. Provisional Patent Application Ser. No. 62/766,558, filed Oct. 26, 2018, which is incorporated herein in its entirety by reference.

BACKGROUND OF THE INVENTION

2. Field of the Invention

The present invention is directed to a system including a process and an apparatus for removal of nitrate and chrome from water. In particular, the present invention is directed to a system for removal of chrome from water utilizing an open-air atmospheric bed and incorporating regeneration processes.

3. Description of the Related Art

Many wells are contaminated with nitrate due to excessive fertilizer use, animal, and human waste. Biological systems convert nitrate to nitrogen gas. However, bacteria require a carbon source and they produce their own waste which must be dealt with. As with all biological systems, is it difficult to maintain consistent water quality that drinking water purification demands.

Reverse osmosis generates huge amounts of waste water which needs disposal. Typically, 10% to 20% of the well water is lost to waste.

Ion exchange is effective at removing nitrate, however, it also generates waste which is very high in salt and nitrate. The volume of waste from nitrate selective is even higher due to its lower loading capacity. This waste is transported great distances and injected into deep wells or discharged to the ocean. This practice promotes earthquakes by pressurizing the formation or pollutes the ocean with nitrates. It is desirable to remove nitrate from wells and produce a valuable fertilizer. This approach makes a zero-waste process possible. The only two products are drinking water and fertilizer.

Even with the higher loading capacity, the regeneration waste volume can be substantial. Therefore, every measure to increase nitrate loading and regeneration efficiency counts. Managing of regeneration liquids, removing alkalinity from various regeneration streams, evaporation and recycling of unused potassium chloride, reducing potassium nitrate product to a solid, and returning sampling and final rinse back to the membrane pump intake are described.

Many water sources have multiple contaminants which end up into the harvest water, such as chrome. It is desirable to remove the chrome from the harvest water. The prior art teaches the use of iron metal under acidic conditions or iron salts which are also acidic to remove the chrome. However, the chrome removal is less than complete and leaves an iron contaminant.

Accordingly, it is a principle object and purpose of the present invention to provide a system to remove nitrates and chrome from water that may operate in both small-scale and large-scale applications.

It is a further object and purpose of the present invention to provide a system to remove nitrates and chrome from water which incorporates a regeneration system.

SUMMARY OF THE INVENTION

The present invention is directed to a system, including a process for removal of nitrate and chrome from water. Incoming nitrate and chrome contaminated water is passed through a nanofiltration membrane. Retentate liquid rejected from the nanofiltration membrane is pumped to effluent or returned to the nanofiltration membrane. Permeate liquid from the nanofiltration membrane is delivered through a well screen upper collector in a first open atmospheric bed having a strong base ion exchange resin. The permeate liquid is pumped through the strong base ion exchange resin bed and through an optional gravel layer beneath the resin.

The permeate liquid is passed from the first bed to a well screen upper collector in a second open atmospheric bed having a strong base ion exchange resin. The liquid is pumped through the second bed and through an optional gravel layer beneath the resin in the second bed.

The ion exchange resin in the first bed and in the second bed is periodically regenerated in accordance with the process of the present invention.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1A:
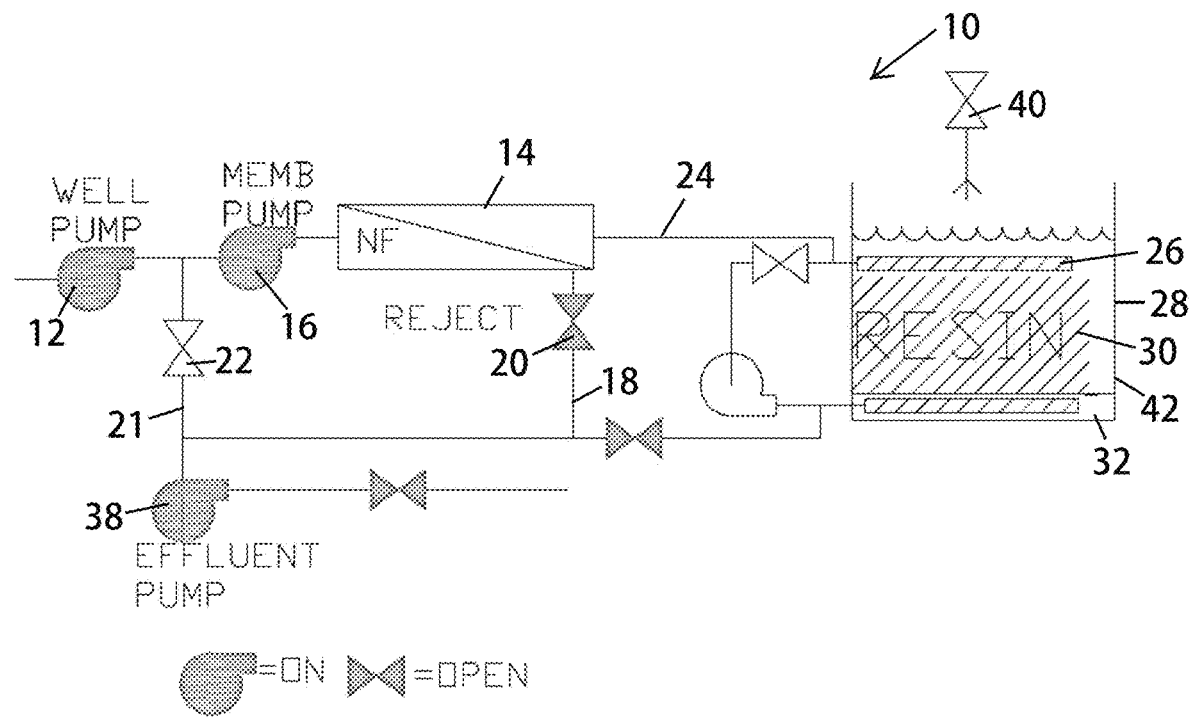
FIG. 1A illustrates a simplified schematic diagram of a first embodiment of the present invention utilizing a single bed system.

Referring to the drawings in detail, FIG. 1A illustrates a simplified schematic diagram of the first embodiment of the present invention utilizing a single bed system, which is shown in service mode. In some applications, such as small wells contaminated with nitrate and chrome, a single bed system may be desirable with a separate, portable regeneration system periodically used to regenerate the resin, as will be described herein.

A number of pumps and valves are shown with the shaded elements designated as on or open and the outlined elements designated as off or closed.

A well pump 12 delivers incoming nitrate and chrome contaminated water to a nanofiltration membrane 14. A membrane pump 16 is used to force contaminated water to and through the nanofiltration membrane 14. Retentate liquid that is rejected from the nanofiltration membrane 14 is directed via a line 18 through a valve 20 to effluent. Alternatively, the retentate liquid may be returned to the nanofiltration membrane through a return line 21 and valve 22.

A nanofiltration (NF) membrane removes or filters out the sulfate from the water which competes with nitrate ions and drives or reduces the nitrate on reject side. Surprisingly, the nitrate concentration is higher on the permeate side than reject side. This is especially true at high permeate to reject ratios of 8 to 1 or 10 to 1. The high osmotic pressure on the reject side promotes the diffusion of nitrate to the permeate side. In some cases, the reduced nitrate on the reject side meets drinking water standards.

Permeate through the nanofiltration membrane 14 will pass via a line 24 to a well screen upper collector 26. The upper collector 26 resides within a vessel 28 which forms an open atmospheric bed having a strong base ion exchange resin 30 within the vessel.

The well screen upper collector distributes effluent across the top of the vessel 28 without disturbing the upper resin layer in either service mode or fluff mode (to be described).

Below the resin layer 30 is a gravel layer 32 within the vessel 28. A well screen pipe lower collector is immersed in the gravel layer or in the resin layer or juxtaposed therebetween. Liquid is drawn through the lower collector through valve 36 via effluent pump 38.

A spray bar 40 is utilized to distribute regeneration fluid (to be described herein) over the top of the resin 30 in the open vessel 28.

Figure 1B:
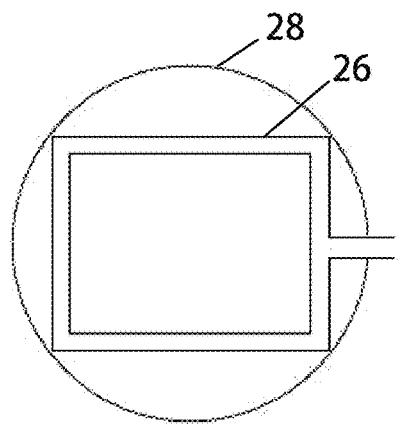
FIG. 1B shows a sectional view of an upper collector of the system shown in FIG. 1A.
Figure 1C:
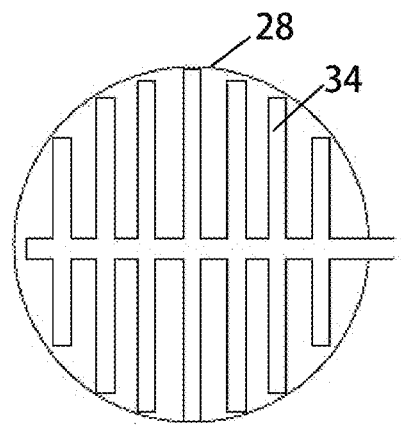
FIG. 1C shows a sectional view of a lower collector of the system shown in FIG. 1A.

FIG. 1B shows a sectional view of the upper collector 26 in the vessel 28, while FIG. 1C shows a sectional view of the lower collector 34 in the vessel 28.

A sample port 42 may be provided in vessel 28 in order to take periodic samples.

The atmospheric bed of the vessel 28 may be supplied with plastic beads having a porous strong base and ion resin for ion exchange. In one non-limiting example, the plastic beads may be polystyrene crosslinked with divinyl benzene.

A nitrate selective resin has a maximum loading capacity of 0.9 eq/liter, while a strong base resin has a capacity of 1.6 eq/liter for a 75% increase in loading capacity. In practice, the nitrate selective resin has less than half the capacity of nonselective strong base resin. In other words, the time between regeneration is 100% longer for strong base resin. This translates into a 50% reduction in regeneration "waste" volume. The strong base resin only treats the sulfate free permeate water.

Even with the higher loading capacity, the regeneration waste volume can be substantial. Therefore, every measure to increase nitrate loading and regeneration efficiency counts. Managing of regeneration liquids, removing alkalinity from various regeneration streams, evaporation and recycling of unused potassium chloride, reducing potassium nitrate product to a solid, and returning sampling and final rinse back to the membrane pump intake are all incorporated in the present invention.

FIGS. 2A, 2B, 2C and 2D illustrate a second embodiment of the present invention utilizing two separate beds and providing for regeneration. The figures illustrate an alternate embodiment 50 utilizing an open two bed system in service mode. Large beds, up to forty feet diameter beds, are possible without sacrificing nitrate removal efficiency. The large diameter beds reduce channeling and wall effect which compromises nitrate removal performance. They have a much lower pressure drop, which reduces pump energy. A three-bed system is not required for reliability. The open bed system also provides an air gap between the resin bed and permeate flow, which eliminates the need for separate air gap tank. For small systems a large single bed system provides simplicity and reliable performance in spite of large changes in nitrate concentration and flow. A large bed may last 6 months or longer. A sample port permits sampling a foot from the bottom of the bed to ensure sufficient time to replenish the bed.

Figure 2A:
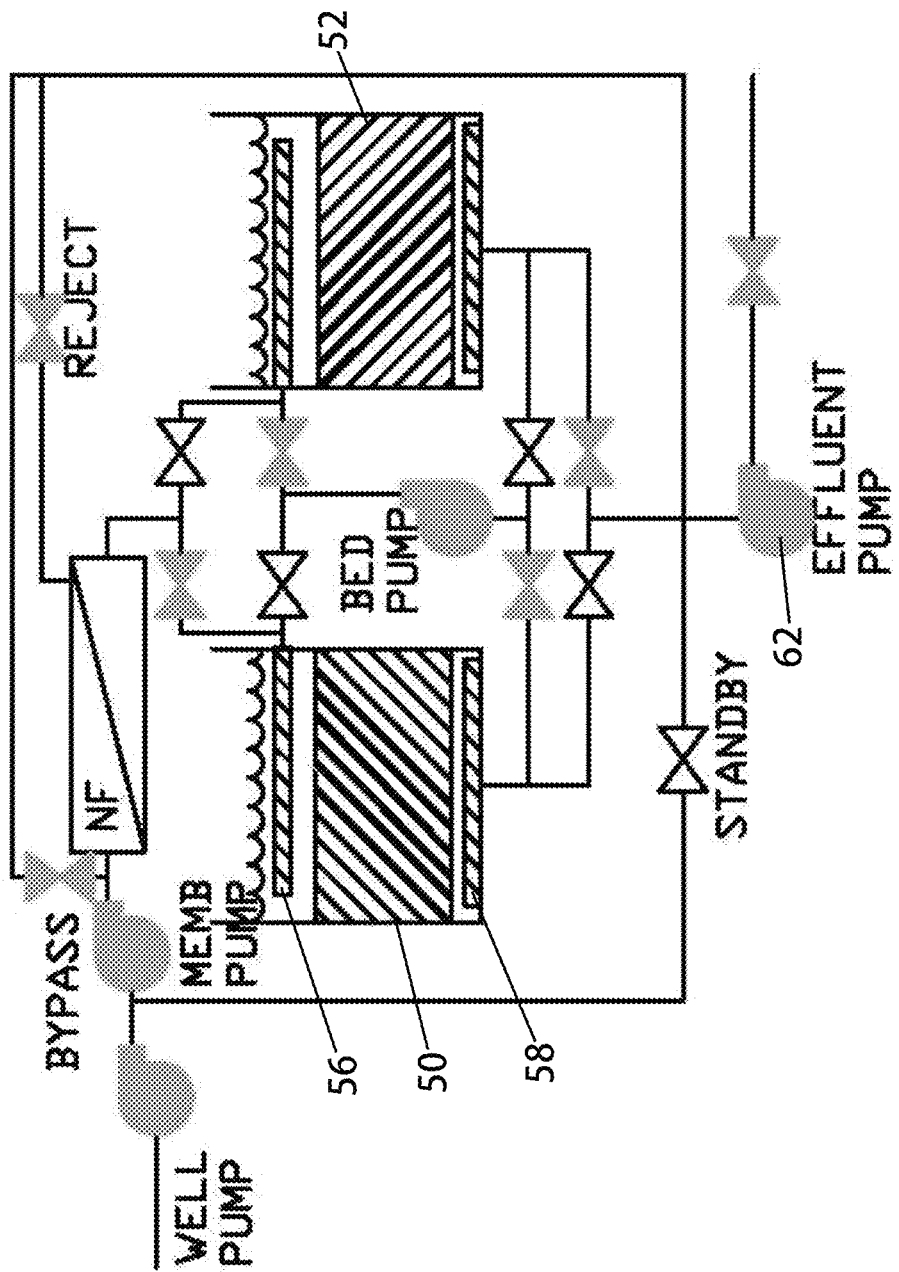
FIGS. 2A, 2B, 2C and 2D illustrate simplified schematic diagrams of a second embodiment of the present invention utilizing a pair of beds.

FIG. 2A illustrates the regeneration system in service mode with a first bed 52 in the lead position and a second bed 54 in the lag position. Both beds are open, which eliminates the need for expensive pressurized beds. This configuration allows the lead bed to become saturated with nitrate, while the lag bed removes any nitrate that leaks past the lead bed. This allows for the continuous production drinking that does not exceed nitrate standards.

Figure 2B:
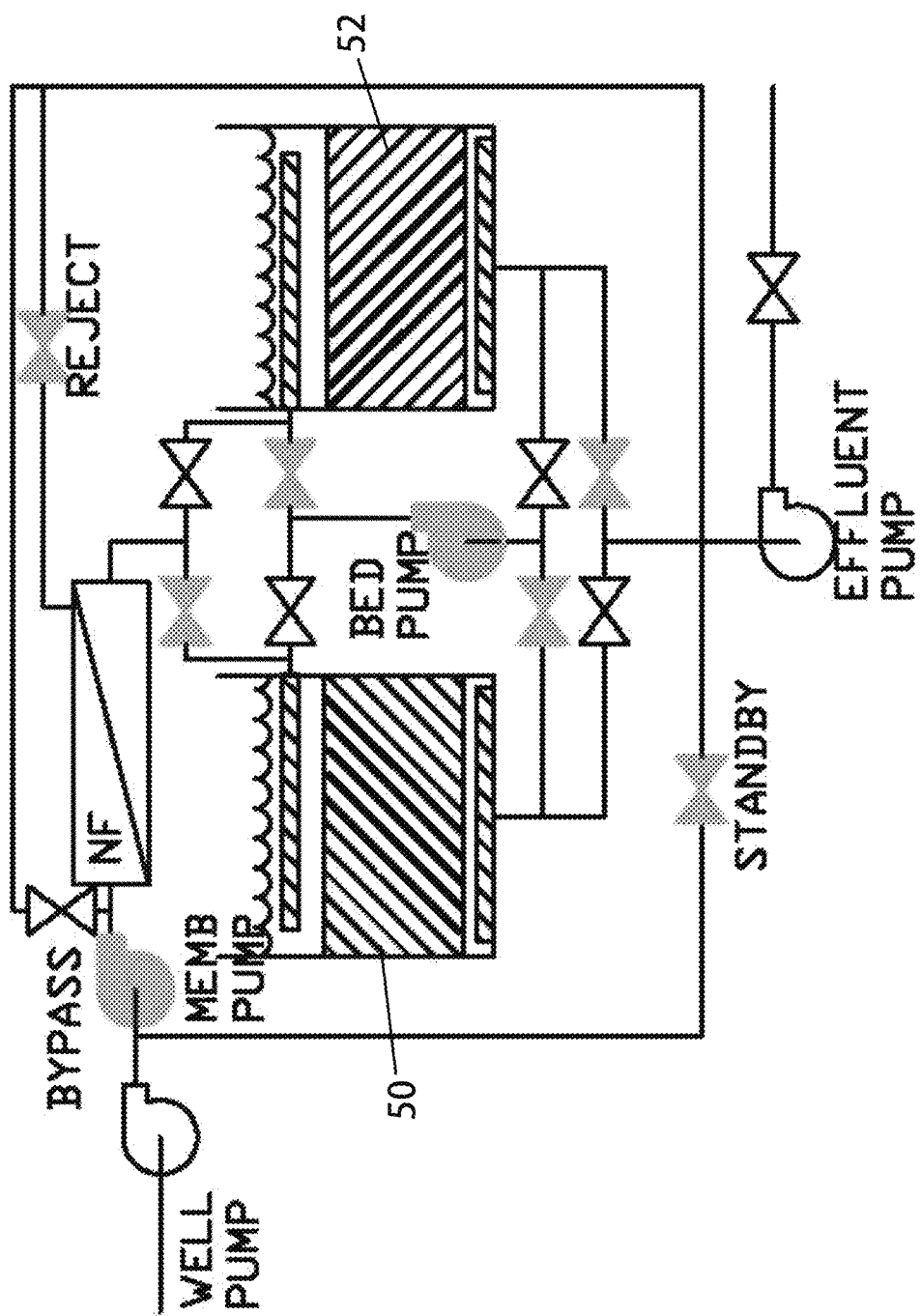

FIG. 2B illustrates the system 50 in a standby mode. It is critical that no high nitrate water is put into the drinking water supply. If the nitrate sensors show that nitrate levels are close to the limit, the system is placed into standby mode. No drinking water is produced and the water is recycled through the system until nitrate levels return to acceptable levels.

Figure 2C:
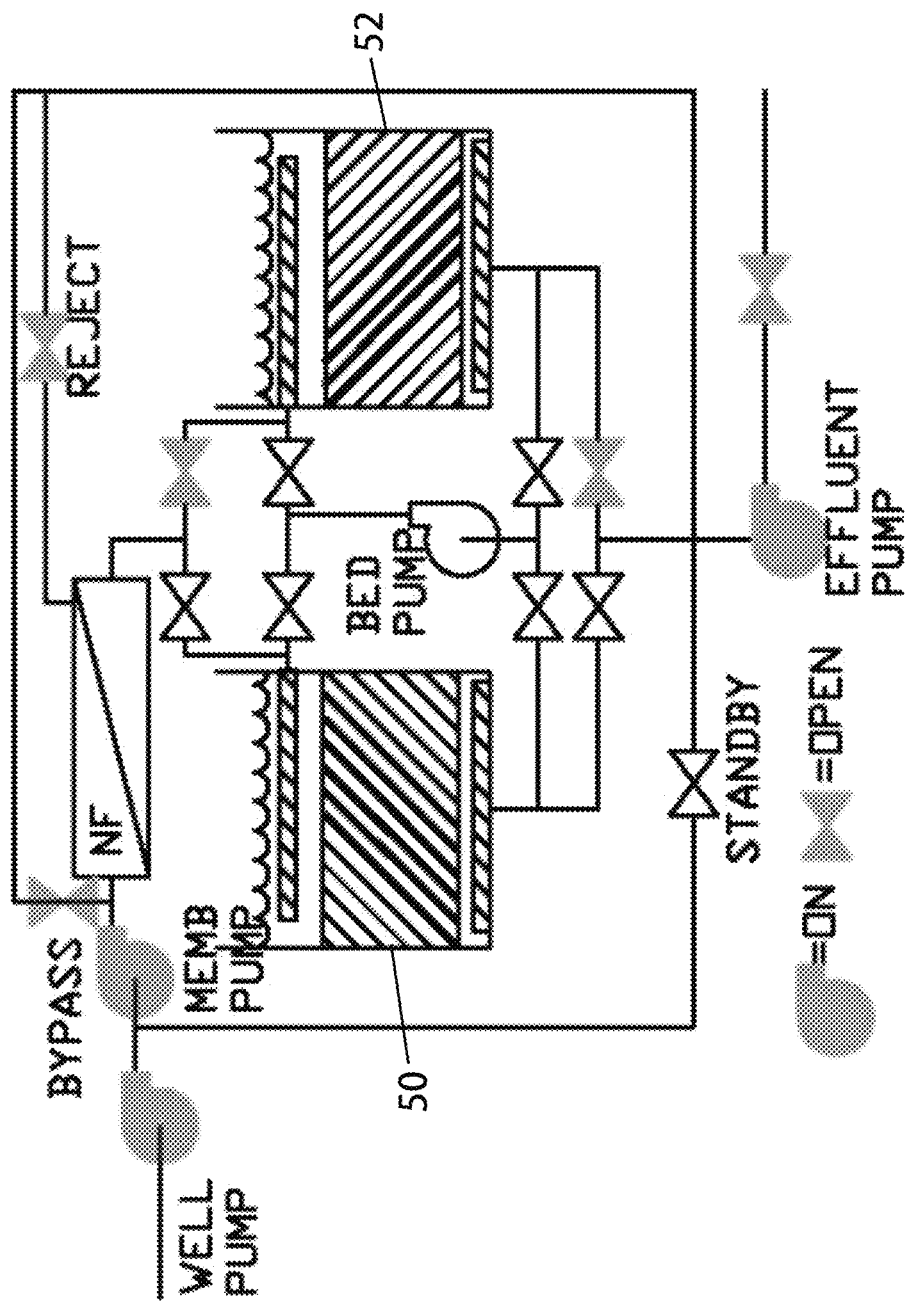

FIG. 2C illustrates the first bed 52 isolated from the service mode water flow, while the second bed 54 remains in service mode. This configuration allows the first bed 52 to be regenerated without interruption of drinking production.

Figure 2D:
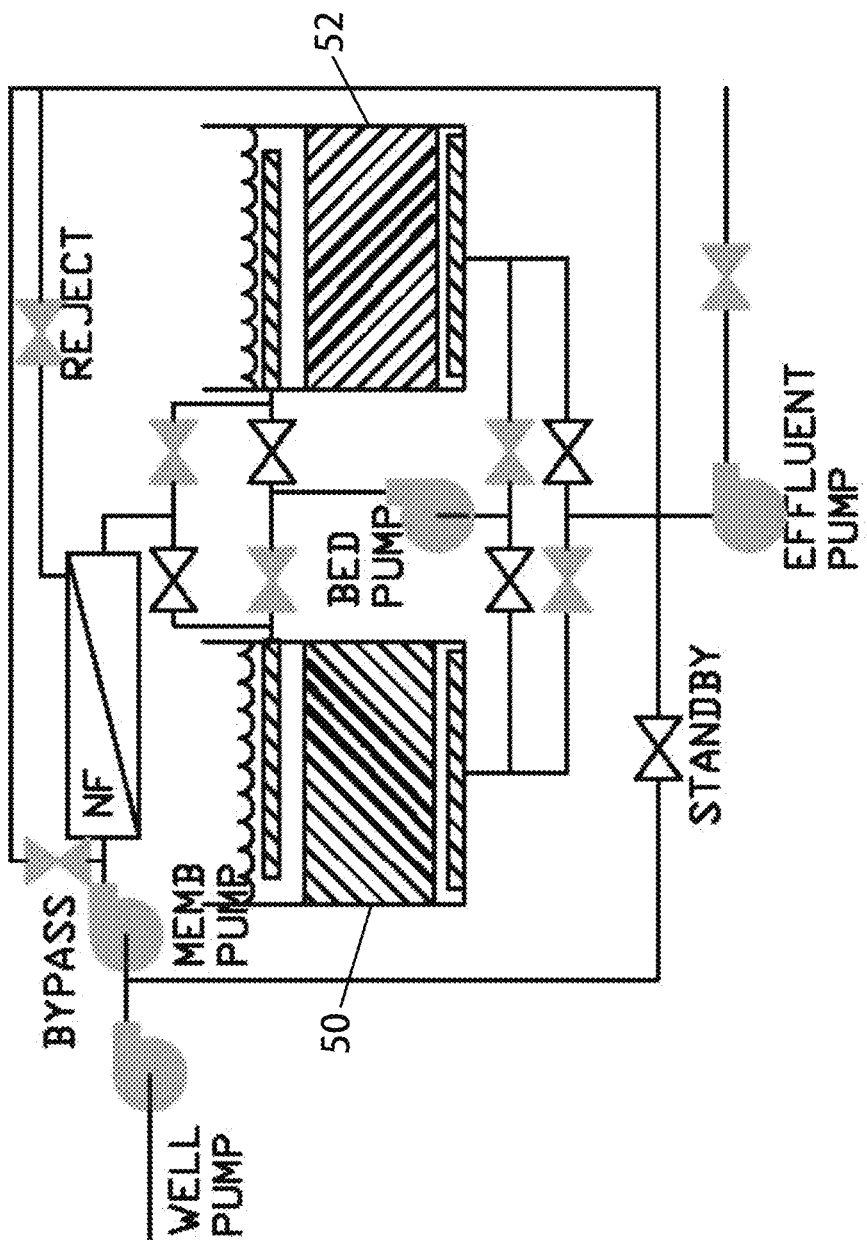

FIG. 2D is similar to FIG. 2A, the only difference is that the first bed 52 is in the lag position, while the second bed 54 is in the lead position.

A well pump supplies water to a membrane pump which supplies water to a nanofiltration membrane such as, for example, Filmtech NF 270 with a MWCO of about 300 daltons. The membrane removes most of the sulfate and about 50% of the chrome, while reducing nitrate concentration in the reject water. The permeate water passes a through an upper well screen collector into the top of the first bed 52. The water is sucked through the first bed resin, the optional gravel layer 58, and a lower well screen collector 56 to maintain a constant liquid level with a bed pump 60 which may have negative pressure to facilitate higher flows and compensate for the pressure drop across the resin bed.

The gravel (about 10 mesh) facilitates uniform flow and reduces the pressure drop across the bed.

The bed pump 60 transfers the liquid to the second bed 54 through a well screen collector to prevent resin agitation. An effluent pump 62 also sucks the water through the resin to maintain a proper second bed liquid level. The level is maintained by controlling the speed of the pump. The reject water is combined with the second bed water. A portion of the well pump water may also be added to the effluent.

Regeneration System

FIGS. 3A, 3B, 3C, 3D, 3E, 3F and 3G illustrate the regeneration process of the present invention.

Initiation of Bed Regeneration

The present invention incorporates a multiplexer system which allows the sampling of many points through the system. Nitrate, pH, and conductivity are measured. All sensors are known to fail from time to time. Therefore, it is desirable to determine bed exhaustion using multiple detection methods.

The beds may be regenerated based on service time with sensors confirming exhaustion. Just before the lead bed starts to exhibit increasing nitrate leakage, there is a rise in pH due to the nitrate pushing carbonate off the resin bed followed by a distinct drop in conductivity. Both indicate the bed is close to exhaustion. When the bed is completely exhausted, the conductivity returns to a level similar to before the exhaustion occurred and a fall of pH. Sensing of conductivity and pH is much cheaper and more reliable than nitrate sensors. They add confirmation to initiate regeneration. In general, when the nitrate level is slightly less than the permeate water nitrate level, regeneration is initiated.

Figure 3A:
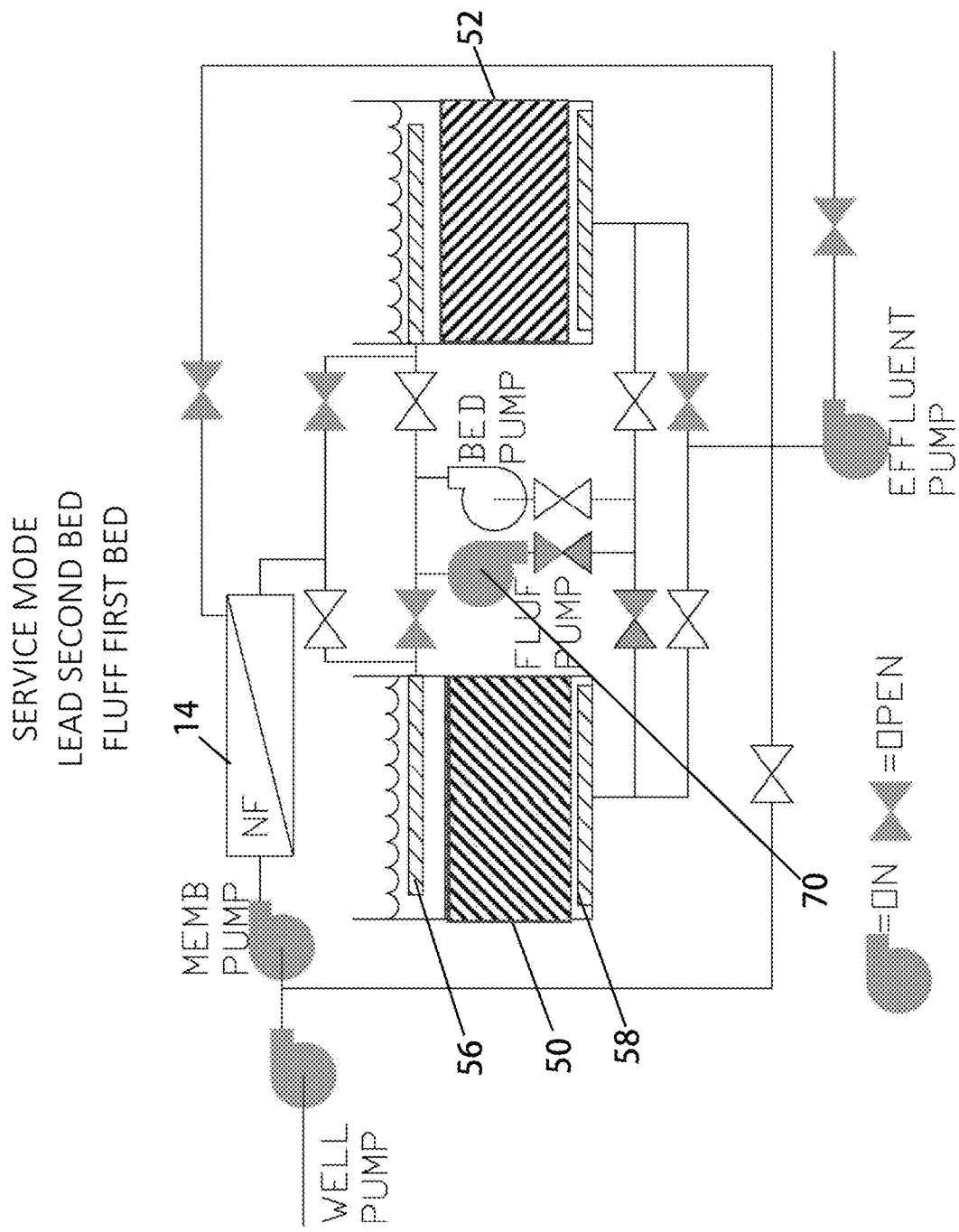
FIGS. 3A, 3B, 3C, 3D, 3E, 3F and 3G illustrate a regeneration process of the present invention.

FIG. 3A illustrates a fluff or backwash step. After the exhausted bed is isolated by closing the upper and lower process water flow valves on the first bed 52, the first bed fluff valve is opened and the fluff pump is turned on. Water continues to be processed through the second bed 54 while the first bed 52 starts the regeneration process.

The fluff pump forces or pushes water into the lower collector 58 and returns via the upper collector. This fluidizes the bed. Sometimes the resin is lifted as a cylindrical unit. Therefore, the pump is paused to ensure the resin breaks up into individual beads devoid of all clumps. Pumping for about one to two minutes, one-minute pause, and then continuing to pump for about seven minutes breakups all the resin clumps. The fluff flow is about 1 gpm per square foot of resin bed area.

Normally this would consume vast amounts of water in a traditional resin system. In this case, no water is consumed because the fluffing (backwashing) is done in closed loop fashion. Since the resin beds only use membrane water in service mode, no suspended solids are introduced into beds during service mode.

Figure 3B:
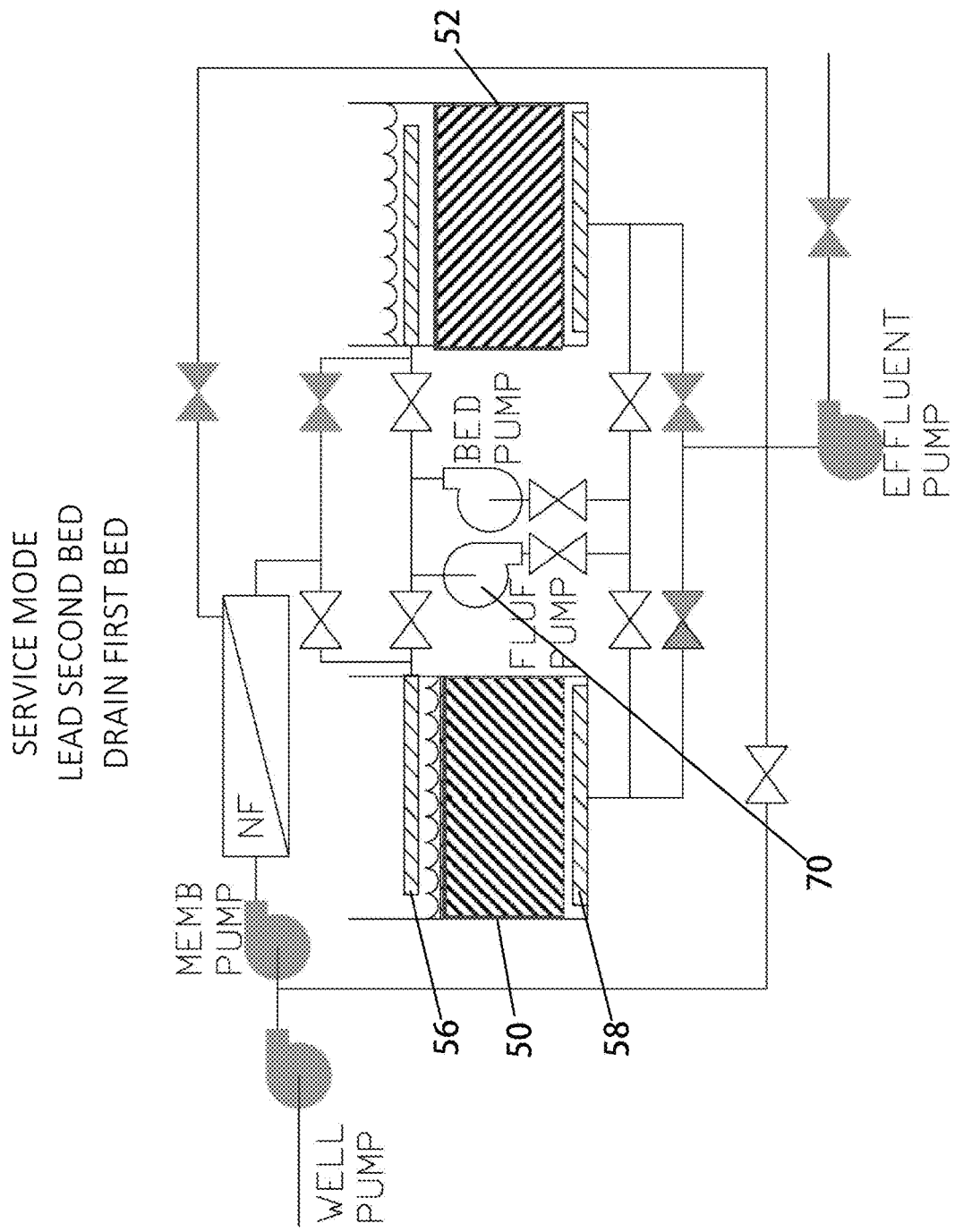

FIG. 3B illustrates a drain step to reduce the amount of water used in regeneration. The water is drained to just above the top of the resin bed. This is done by opening the second bed 54 effluent pump intake valve.

Figure 3C:
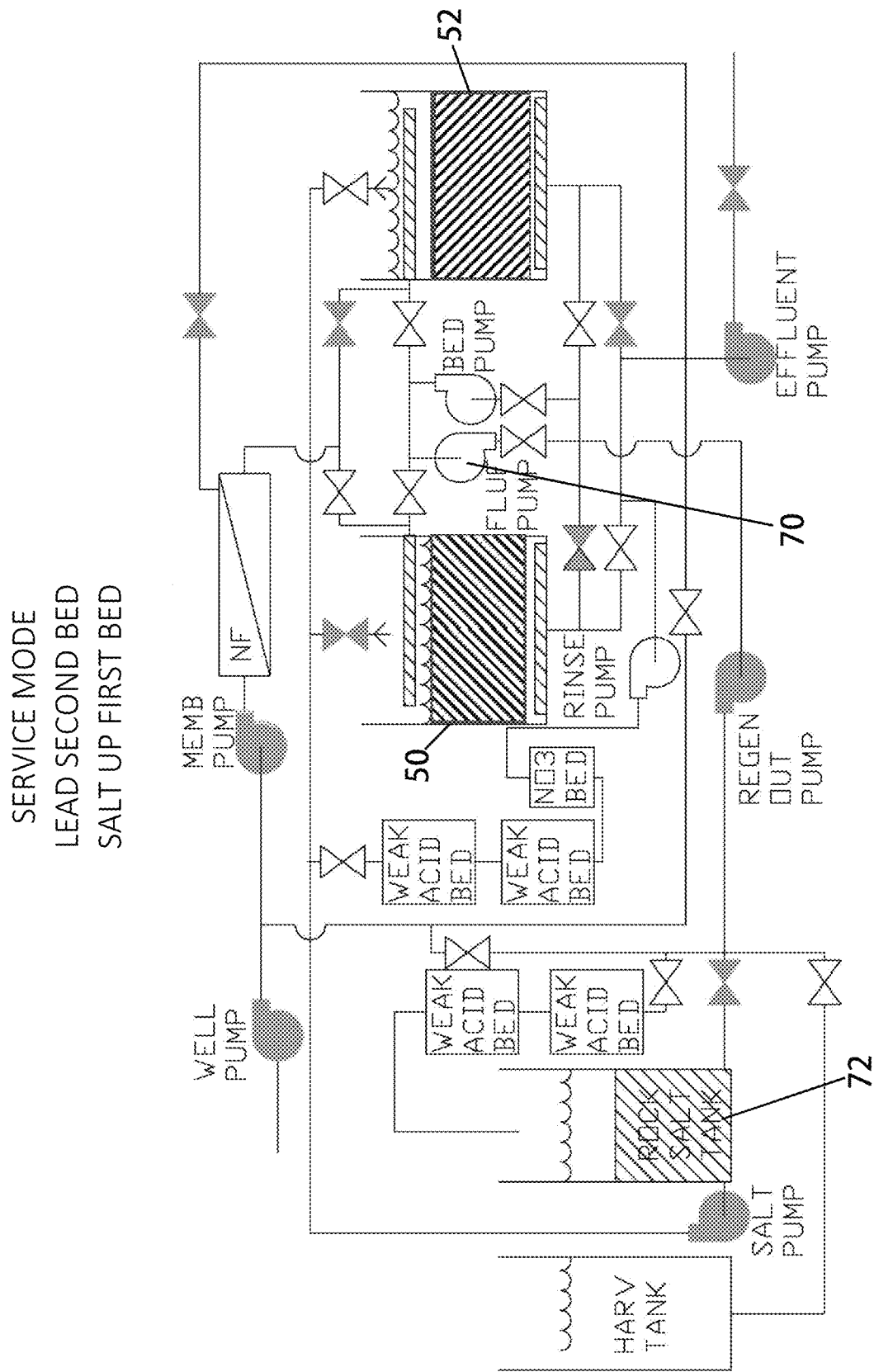

FIG. 3C illustrates a salting up step of the process. Nitrate can be removed from the resin unit if the potassium chloride (or sodium chloride) concentration exceeds a few percent by weight. If one introduces a saturated salt solution at the top of the bed, the solution races to the bottom of the resin bed (due to its high density) before there is time for the exchange between the nitrate ions on the resin to exchange with the chloride ions.

It is more efficient to use the water in the resin bed itself as a water source to dissolve the rock salt. Water is pumped from the resin bed to the side of the rock salt tank and the resulting saturated salt brine is collected and pumped into the top of the resin bed. This flow is continued until the resin bed is about 50% of the saturated brine concentration (about 17% salt by weight).

This step consumes no water and produces no additional regeneration "waste".

By running the flow at the bottom of the rock salt tank in a crossflow fashion, any nitrate that sheds up the resin will remain at the bottom of the rock salt tank.

The flow rate through the bed is about one bed volume per 4 hours. The total volume passed through the resin bed is 0.5 resin bed volume. A bed volume is defined as the actual volume of only the bulk resin. If 100 cubic feet resin is in the resin vessel, one bed volume is 100 cuft (750 gallons).

Figure 3D:
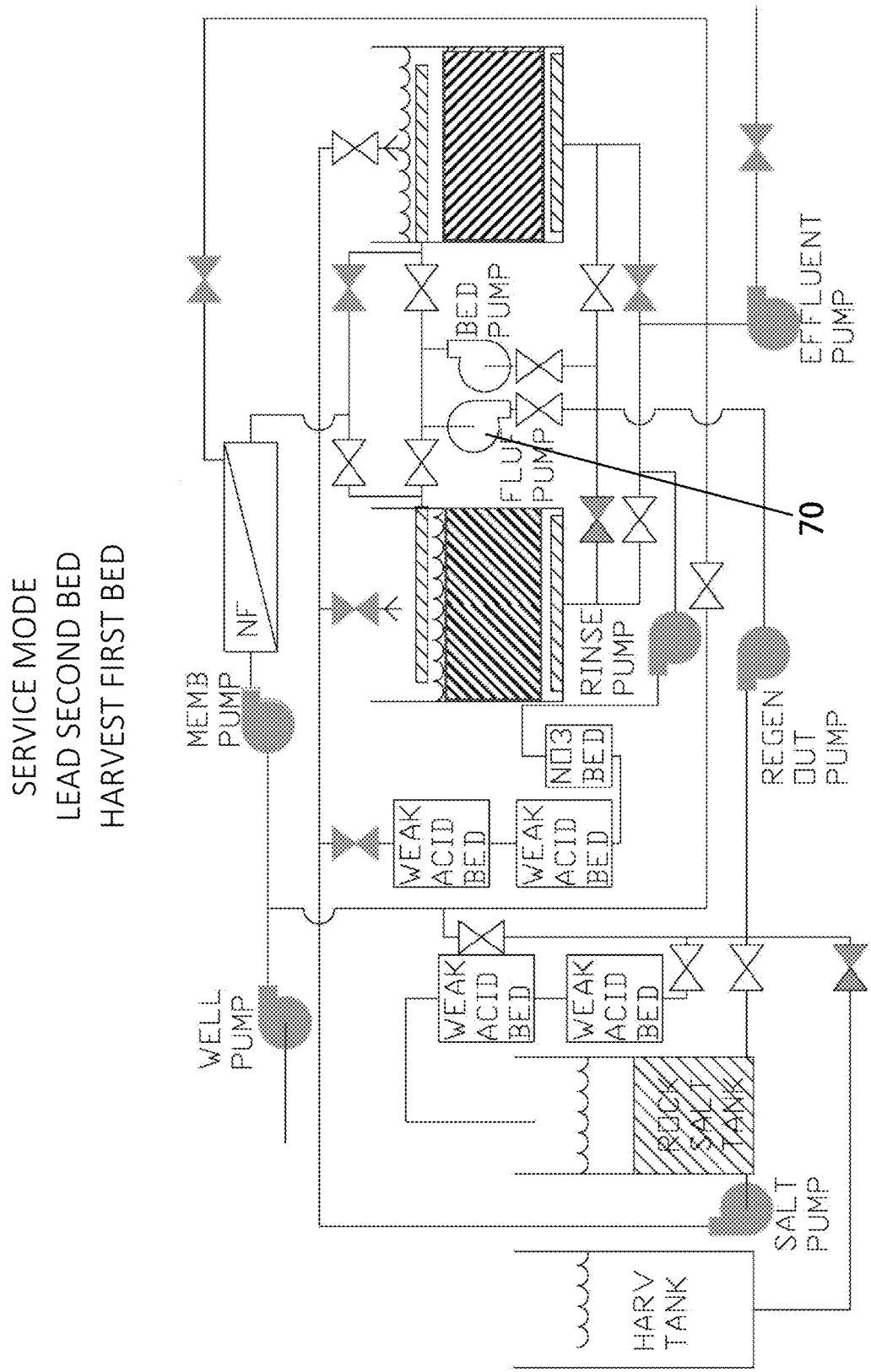

FIG. 3D illustrates the harvest step in which product potassium nitrate liquid fertilizer is collected. About 1.5 to 3 bed volumes of liquid are collected in the harvest tank.

In this step, the regeneration out pump and valve for the second bed 54 is opened to suck the fertilizer product from the bottom of the second bed 54. To maintain the liquid level in resin bed 52 and maintain a constant brine concentration of about 50% of saturation, the salt pump and the rinse pump are turned off with about equal flows from each pump, while the regeneration out pump would run at a flow equal to combine flow of the rinse and salt pump.

A rinse pump sucks water from the effluent from the second bed 54 through the optional resin beds and to combine with the output of the salt pump. These combined flows exit a spray bar valve to evenly distribute over the top of the first bed 52.

The regeneration out pump sucks from a regeneration out valve and transports the fluid to harvest tank via a harvest valve.

Optionally, one can use a nitrate resin bed (to ensure low nitrate rinse water) and a weak acid resin bed in hydrogen form to ensure any trace alkalinity and hardness is removed. The lower pH of the weak acid enhances nitrate removal without risking resin destruction, which occurs if the pH is too low.

Figure 3E:
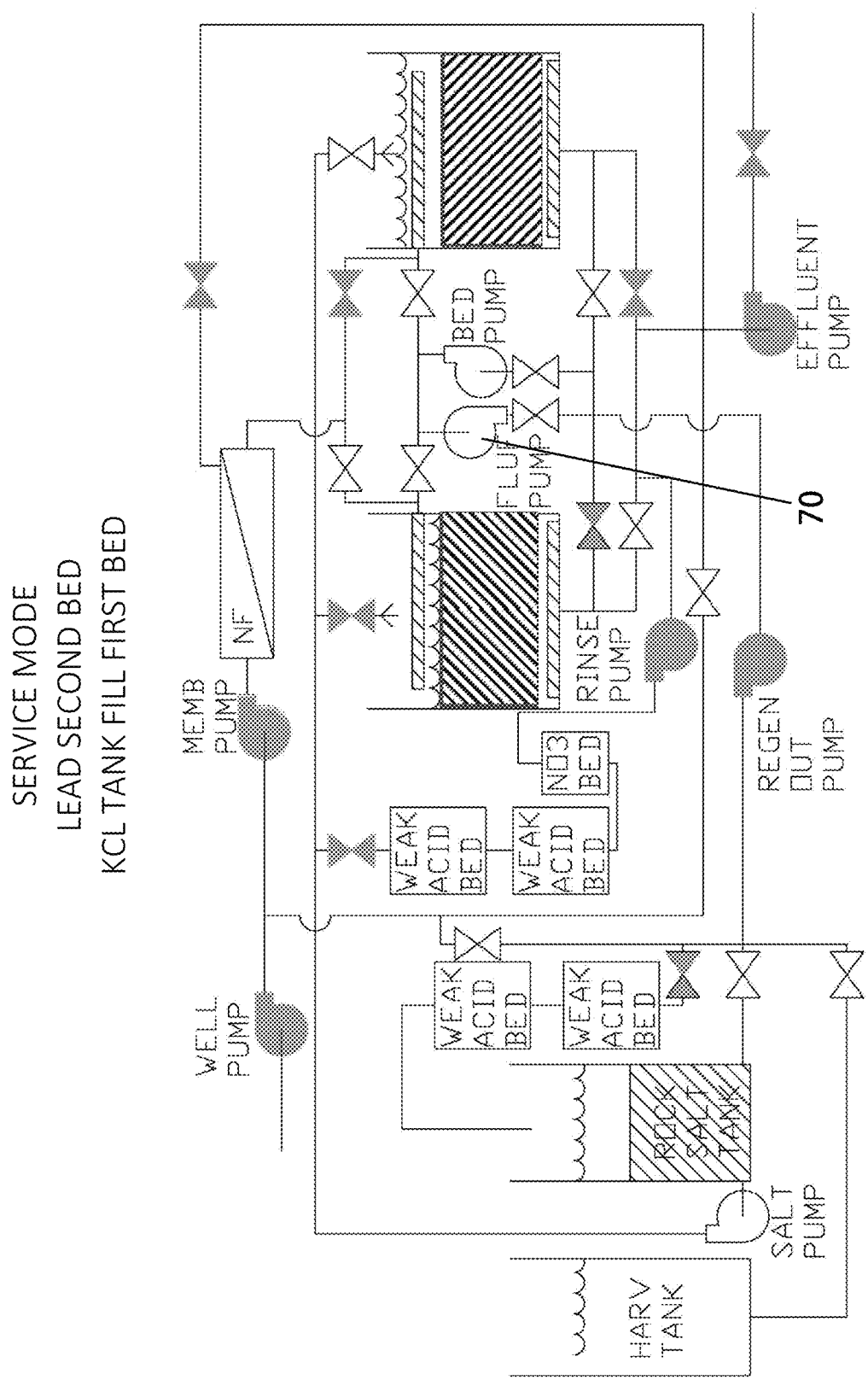

FIG. 3E illustrates the potassium chloride (KCl) rock salt tank refill.

During this step, only the rinse pump and regeneration out pump are operating at equal flow. This is continued until the volume of saturated salt brine removed during harvest is replaced with an equal volume of low nitrate fresh water, such as the effluent from the second bed 54. This volume is about ½ the harvest volume. This step rinses out the majority of salt and nitrate from the first bed 52. Optionally, this fresh water may pass through a small nitrate resin bed to reduce nitrate levels.

Figure 3F:
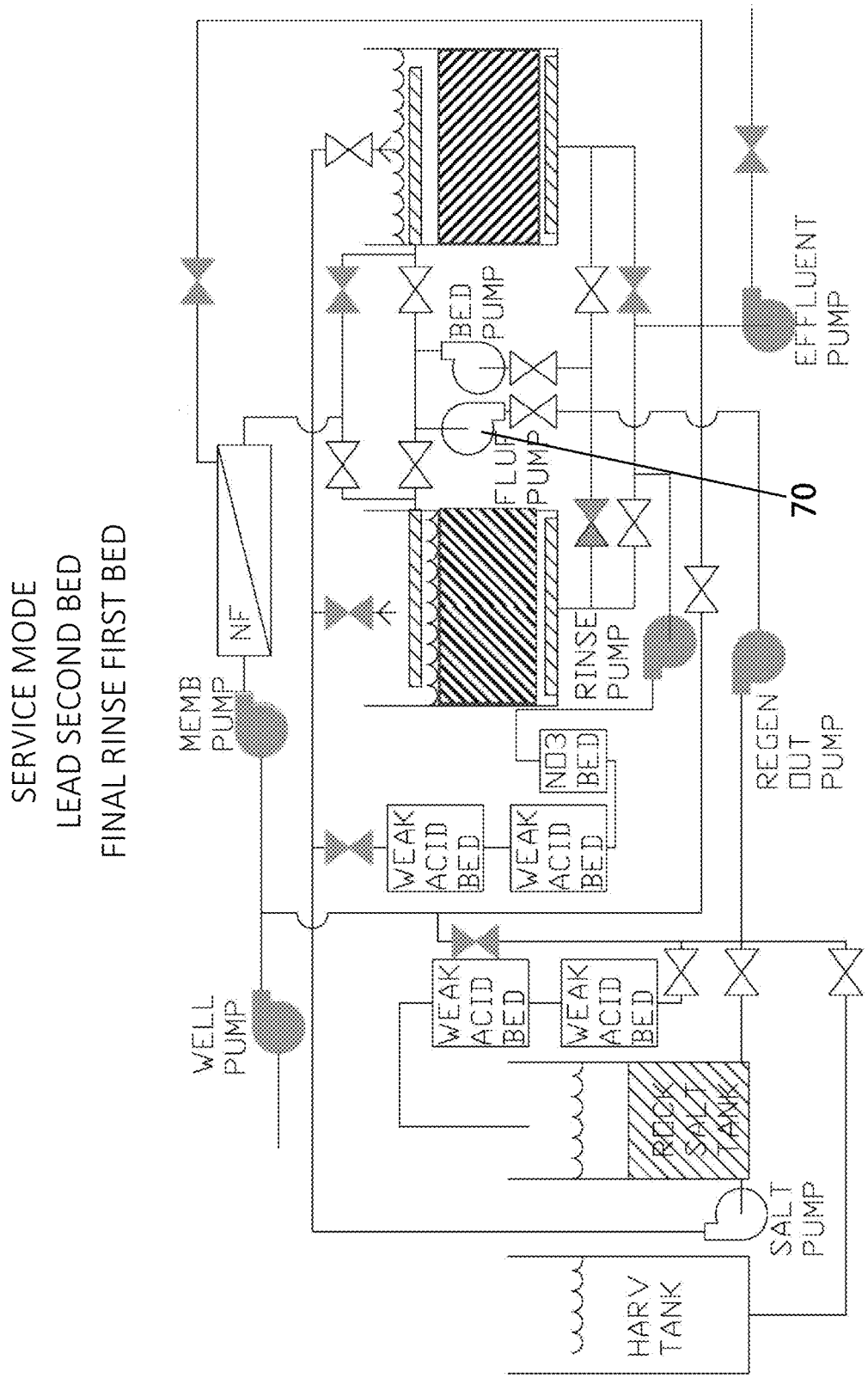

FIG. 3F illustrates a final rinse.

To ensure the first bed 52 is thoroughly rinsed, the rinsing is continued and the effluent is returned to the bypass/recirculation tank for reprocessing until the nitrate levels meet the drinking water standards.

Figure 3G:
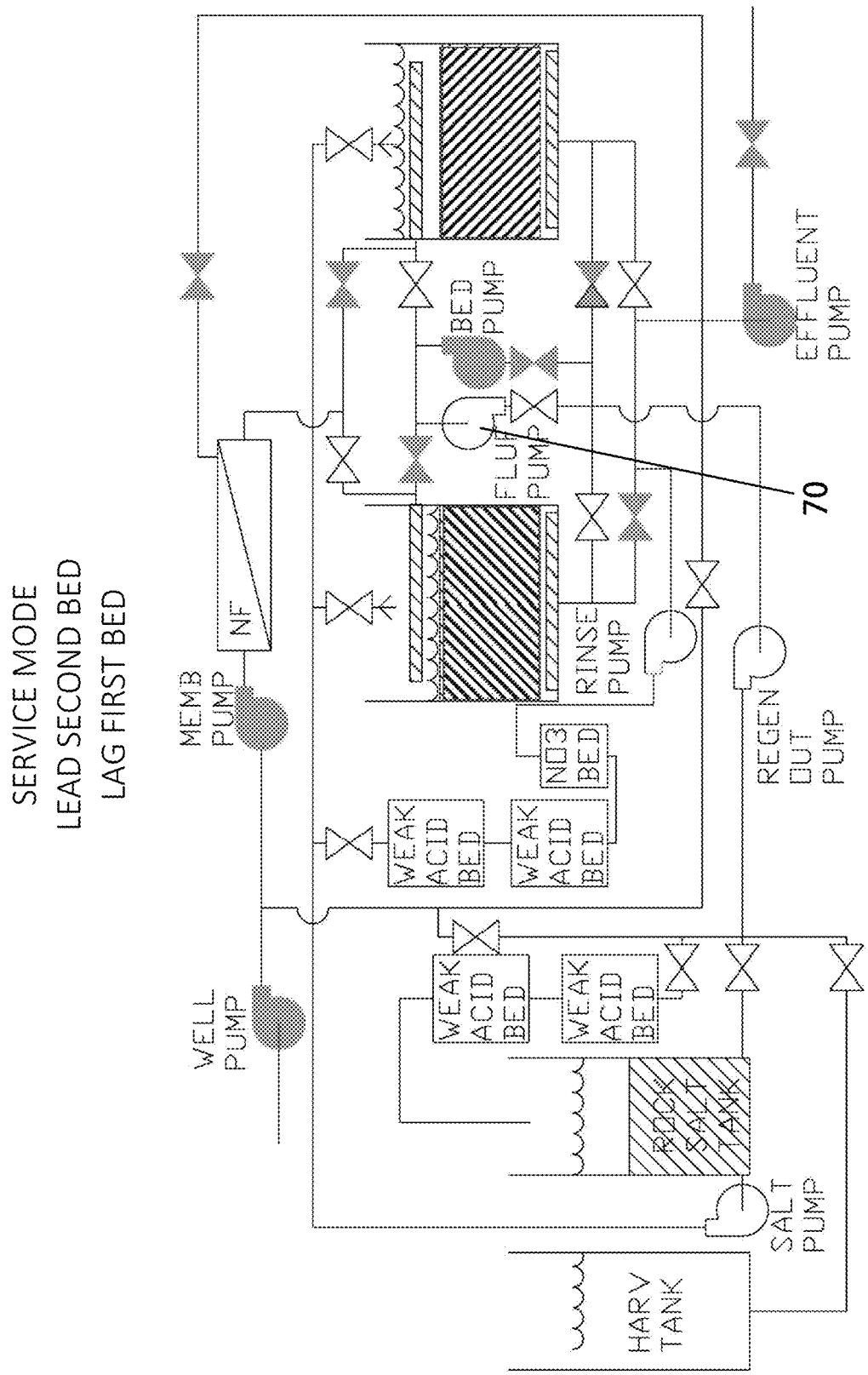

FIG. 3G illustrates placing the newly regenerated bed into the lag position.

The sequential process illustrated in the figures may be described by the following steps:

Step 1 (Back Wash)

The exhausted resin bed is isolated and backwashed with a fluff pump 70 by pumping a portion output from the resin bed which is in service in an upward flow through the exhausted resin and returning it to the input of the resin bed in service. The fluff pump 70 flow is about 1 to 3 gpm per square foot. It is run for about 5 minutes, turned off for 3 minutes and run for another 5 minutes. The pause in flow breaks up any clumps and ensures complete fluidization of the bed. This step eliminates the backwash water waste stream. One may place a filter on the output of the exhausted bed. However, since the resin beds only input is permeate water from the NF membrane 14, this is generally not necessary.

Step 2 (Drain)

A significant source of regeneration waste is the water above the resin bed. Therefore, this water is drained to just above the top of the resin and transferred to the membrane feed pump.

Step 3 (Salting Up)

Significant amounts of nitrate are not released from the resin bed until a high salt level is attained in the resin bed. The salt water just flows past the resin (due to gravity) before any significant exchange can take place. Therefore, the resin bed output water is passed through the bottom of the potassium chloride rock salt tank in a cross-flow manner and pumped through the resin bed in a downward flow. This flow creates a closed loop between the rock salt tank 72 and the resin bed during this step. The potassium chloride salt dissolves as it passes across the bottom of rock salt tank. No regeneration waste is generated in this step. Approximately ½ bed volume is passed through the resin over a 3 to 10-hour period. This step builds up the salinity of the resin bed.

Step 4 (Harvest)

The resin does not regenerate efficiently under alkaline conditions, however, the resin will decompose if the water contains significant amounts of strong acids, such as if sulfuric, hydrochloric, or nitric acid are present. Also, it is difficult to thoroughly regenerate the resin with water that contains nitrate. In addition, in many cases, the only water source available is contaminated with nitrate and alkalinity. The primary inhibitor to thorough regeneration is alkalinity. The water output from the resin bed in service is passed through a nitrate resin bed (optionally) to remove the last traces of nitrate and two weak acid resin beds in acid form in series to remove any traces of alkalinity. The nitrate resin bed is run in downward flow, while the two weak acid beds are run in series in an upflow to release any CO2 gas that is generated in the resin beds. The pH of the lead weak acid bed is monitored. The lead weak acid resin bed is replaced with the lag bed and the lag bed is replaced with fresh resin bed, when the lead bed effluent has a pH of 7 to 9. Typically, the effluent which is combined with a saturated potassium chloride (KCl) solution has pH of about 2.5 to 4 and a NO3-N level less than 1 ppm. The ratio of "rinse" water to saturated potassium chloride (KCl) solution is approximately 1 to 1.

It is passed through the resin bed at a rate of approximately 10 hours per bed volume. Typically, 1.5 to 3 bed volumes are passed through the resin bed. More can be passed through the resin for a more thorough removal of nitrate from the resin bed. This is the only step which generates liquid which must be converted to fertilizer or disposed of.

Step 5 (KCl Tank Fill)

After the harvest step, the resin bed is washed with "rinse water" to remove the majority of salt from the resin bed. The output is the primary source of alkalinity; therefore, it is passed through two weak acid resin beds in hydrogen form in series in an upflow fashion to displace any CO2 bubbles from the resin and used to refill the KCl tank from the top to provide sufficient saturated KCl liquid for the next regeneration cycle. The exhausted weak acid resin is monitored and replaced in the same fashion as in STEP 4.

Step 6 (Final Rinse)

It is desirable to remove the last trace of salt and nitrate from the bed before the newly regenerated bed is placed into the lag position. Rinse water flow is continued and effluent is directed to the input of the membrane pump for reprocessing. The length of the final rinse is determined primarily by time. However, pH, conductivity, and nitrate may be checked before placing the newly regenerated bed in the lead position. Typically, the NO3-N level is less than 7 ppm. Conductivity is similar to the permeate water.

Harvest Water Evaporation & Concentration

Figure 4A:
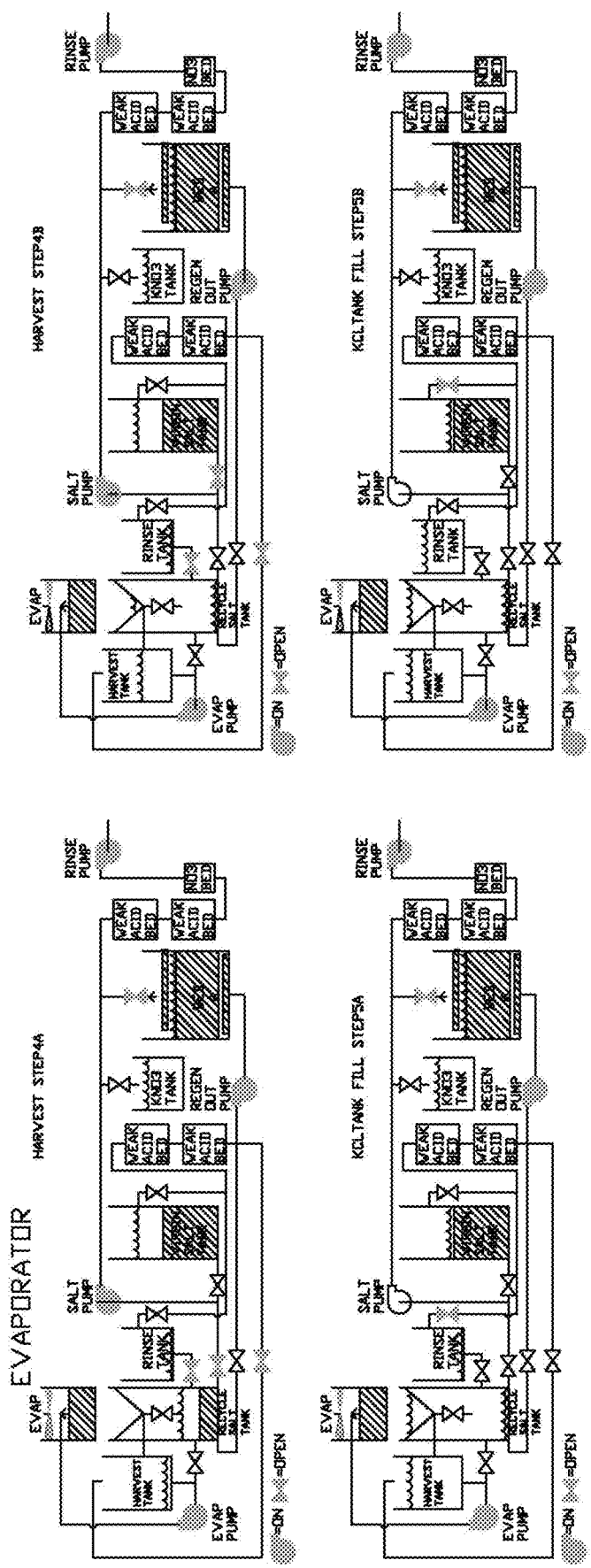
FIGS. 4A, 4B and 4C illustrate a process of harvest water evaporation and concentration of the system of the present invention.
Figure 4B:
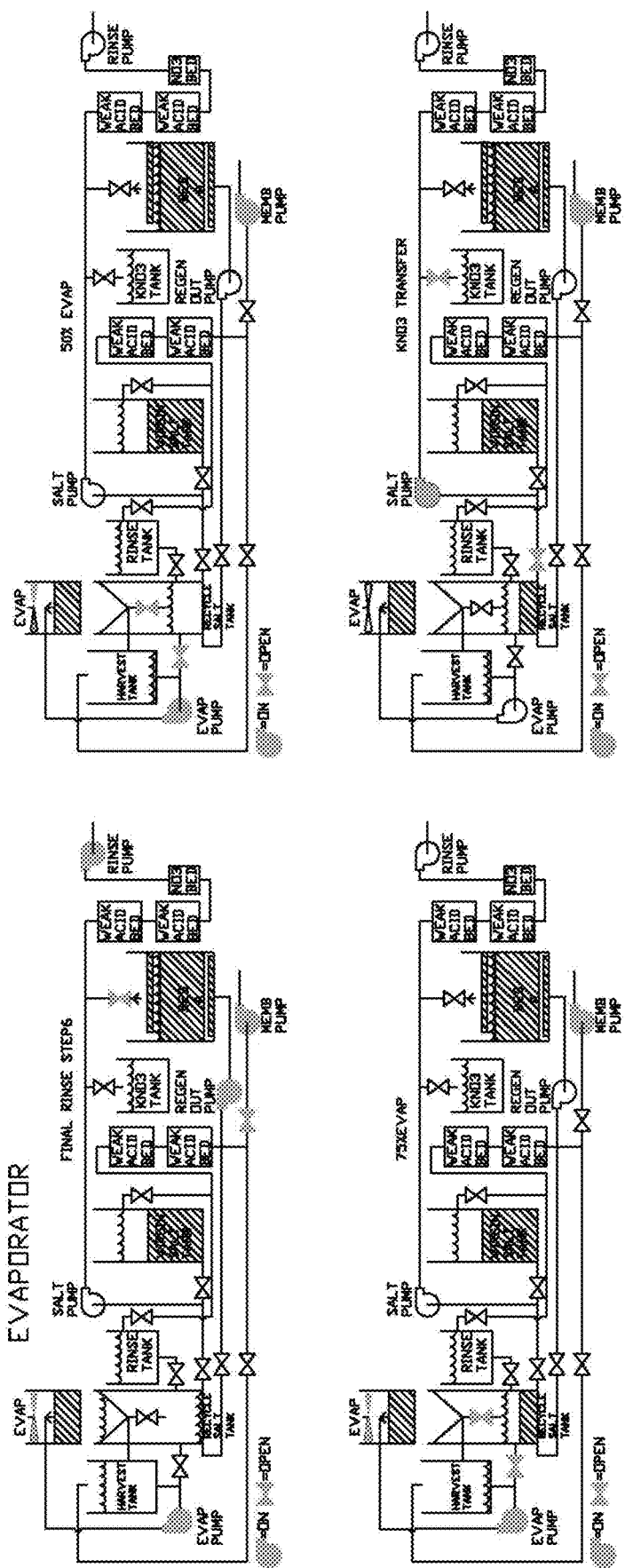
Figure 4C:
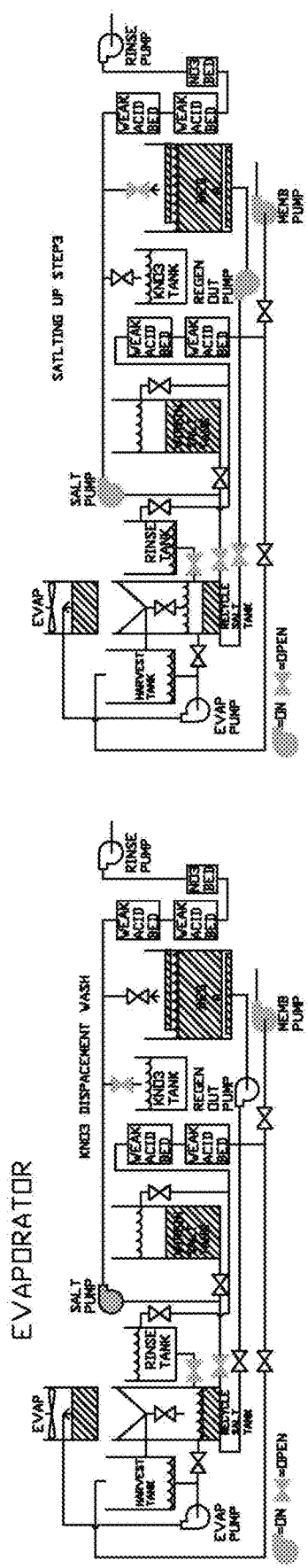

The process of harvest water evaporation and concentration is illustrated in FIGS. 4A, 4B and 4C.

The volume of harvest liquid can be reduced by 50% through evaporation without precipitation of salt crystals to concentration of up to 34% solution.

Surprisingly, upon further evaporation, the KCl drops out first as pure potassium chloride crystals, even though potassium nitrate is less soluble than potassium chloride. The evaporation continues until most of the KCl is recovered as potassium chloride crystals. The liquid potassium nitrate fertilizer is drained to the top of the recycled potassium chloride crystals with the salt pump and collected in the fertilizer KNO3 tank. These crystals are displacement washed with the first portion of liquid leaving the resin bed in STEP 5 and the output is pumped into the KNO3 tank with the salt pump. The resulting crystals are recycled for salting up resin bed and the first part of the harvest (STEP4). The final part of the harvest uses virgin potassium chloride crystals from the KCl tank. The water source for the virgin potassium chloride crystal, is the last portion of water product in (STEP5).

This reduces KCl consumption by approximately ⅔ and reduces the harvest volume by approximately 15-fold, reducing the regeneration output from 15 gallons per cubic foot of resin to approximately 1 gallon. The 25% potassium nitrate solution can be evaporated to solid crystals and the volume reduced another 4-fold.

The harvest water is evaporated in the harvest tank and redirected to the recycle salt tank when the harvest step is completed. Everything remains in solution until 50% of the water is evaporated. This is achieved with a cooling tower using ambient or warm air as the heat source or heating the liquid itself. The evaporation process occurs at or below ambient air temperature. As the evaporation continues, potassium chloride crystals accumulate at the bottom of the recycle salt tank. The evaporation process is stopped when the majority of the potassium chloride is in crystal form. Any salt crystals on the cooling tower fill are rinsed off with the harvest water at the beginning of the next evaporation cycle.

The potassium nitrate solution is pumped out of the recycle salt tank with the salt pump to the potassium nitrate (KNO3) tank when the level reaches the top of the salt crystals. A portion (about 70%) of the KCl tank fill STEP 5 water is stored in the rinse tank and added when the level reaches the top of the salt crystals while the salt pump continues to transfer liquid to the KNO3 tank until most of the potassium nitrate solution is rinsed off the potassium chloride crystals. This is about one void volume (the volume of liquid in between the potassium crystals). The salt pump is turned off. The balance of the rinse tank water is transferred to the recycle salt tank.

The liquid in the KNO3 tank can be evaporated to solid potassium nitrate crystals.

The remaining portion of the KCl fill STEP 5 water (about 30%) is added to the top of the virgin salt tank. The recycled salt tank is used as salt pump liquid for salting up STEP 3 and about 70% of the harvest STEP 4.

The virgin salt tank is used as a salt pump liquid source for about the last 30% of the harvest STEP 4.

Chrome Removal

Figure 5:
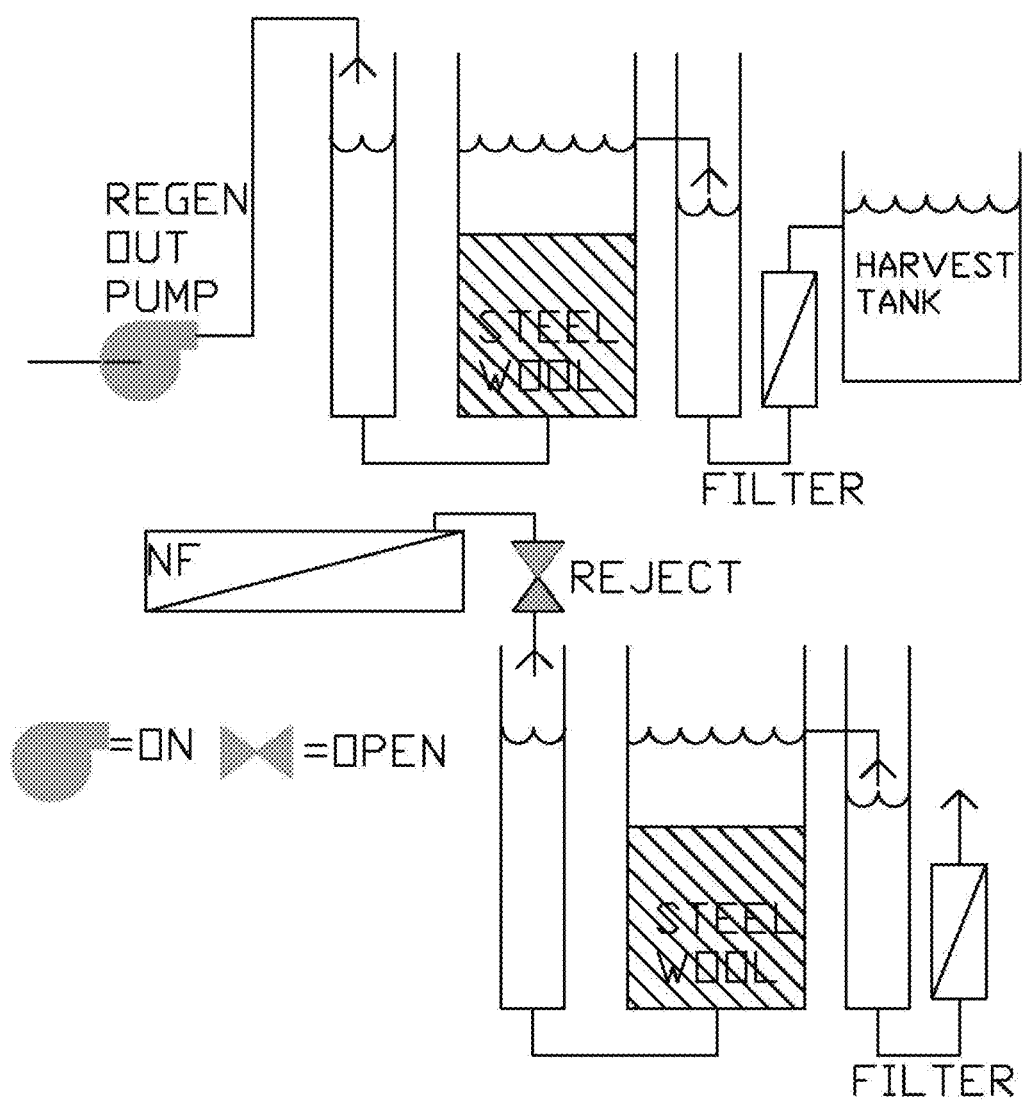
FIG. 5 illustrates a simplified schematic illustrating a process for chrome removal as a part of the system of the present invention.

FIG. 5 illustrates an optional process to remove chrome or chromium ions from water.

Many water sources have multiple contaminants which end up in to the harvest water, such as chrome. It is desirable to remove the chrome from the harvest water. The prior art teaches the use of iron metal under acidic conditions or iron salts which are also acidic to remove the chrome. The chrome removal, however, is less than complete and leaves an iron contaminant.

Surprisingly, the use of steel wool or steel figments under alkaline pH and oxygen (air) followed by exposure to air and filtration reduces chrome to a nondetectable level without iron contamination. The resulting harvest solution has a salt concentration of 17% at an approximate ratio of 4 parts potassium nitrate to 6 parts potassium chloride. The oxygen facilitates chrome and iron removal before and after the steel wool column.

This arrangement can be used to remove chrome from the membrane reject water by maintaining sufficient oxygen in the reject water before and after the steel wool and maintaining a neutral to alkaline pH. The oxygen level is controlled with a redox sensor and oxygen injector. In some cases, the oxygen level in the reject water is sufficient to remove the chrome.

The nanofilter membrane removes 97% of the sulfate which interferes with absorption of chrome with a strong base resin. The strong base resin can remove chrome to non-detectable levels. For example, with a feed of 10 ppm sulfate and 0.4 ppm chrome, a cubic foot of strong base resin could treat up to 2 million gallons of water.

By controlling the oxygen, the iron is only consumed as it is needed.

Example 500 gpm system with an influent of 10 ppm NO3-N 10 and effluent of 7 ppm NO—N. and a resin bed life of three days:

| | Effluent | Prior Art Regen | Harvest Water | Evap 50% | NO3 liquid | KNO3 Cake |
|---|---|---|---|---|---|---|
| | | | Gallons/cycle | | | |
| Per cycle | 2,000,000 | 12,000 | 1,200 | 600 | 300 | 75 |
| Per year | 800-acre ft* | 3,000,000# | 150,000 | 75,000 | 40,000 | 10,000 | the higher regeneration waste volume is due to more frequent regeneration requirements.

The present invention provides a system including a process and apparatus to remove nitrate and chrome from water.

Whereas, the invention has been described in relation to the drawings attached hereto, it should be understood that other and further modifications, apart from those shown or suggested herein, may be made within the scope of this invention.

What is claimed is:

1. A process to remove nitrates and chrome from water, which process comprises:
   passing incoming nitrate and chrome contaminated water through a nanofiltration membrane;
   pumping retentate liquid rejected from the nanofiltration membrane to effluent or returning to the nanofiltration membrane;
   delivering permeate from said nanofiltration membrane through a well screen upper collector in an open atmospheric bed having a strong base ion exchange resin;
   extracting, with a pump, said permeate through said ion exchange resin, through a gravel layer beneath said resin in said open atmospheric bed and from said open atmospheric bed; and
   periodically regenerating said strong base ion exchange resin.

2. The process as set forth in claim 1 including forcing said incoming contaminated water through said nanofiltration membrane with a membrane pump.

3. The process as set forth in claim 1 wherein said atmospheric bed is an ion exchange vessel with plastic beads having a porous strong base anion resin for ion exchange.

4. The process as set forth in claim 3 wherein said plastic beads are polystyrene crosslinked with divinylbenzene.

5. The process as set forth in claim 3 wherein a liquid level is maintained in said ion exchange vessel at a desired level by controlling the speed of a variable speed bed pump.

6. The process as set forth in claim 1 wherein said nanofiltration membrane is a polyamide thin film composite.

7. The process as set forth in claim 1 wherein said retentate liquid rejected from said nanofiltration membrane is directed through a vessel containing steel wool maintained at neutral to alkaline pH to remove chrome.

8. The process as set forth in claim 1 including a lower well screen pipe collector juxtaposed between said resin and said gravel layer.

9. The process as set forth in claim 1 wherein said permeate liquid is directed through a vessel containing steel wool maintained at neutral to alkaline pH to remove chrome.

10. A process to remove nitrates and chrome from water, which process comprises:
    passing incoming nitrate and chrome contaminated water through a nanofiltration membrane;
    pumping retentate liquid rejected from said nanofiltration membrane to effluent or returning to the nanofiltration membrane;
    delivering permeate liquid from said nanofiltration membrane through a well screen upper collector in a first open atmospheric bed having a strong base ion exchange resin;
    extracting, with a pump, said permeate liquid from said strong base ion exchange resin bed and through a gravel layer beneath said resin in the first bed;
    passing said permeate liquid from said first bed to a well screen upper collector in a second open atmospheric bed having a strong base ion exchange resin;
    extracting, with a pump, said liquid from said second bed and through a gravel layer beneath said resin in said second bed; and
    periodically regenerating said ion exchange resin in the first and second beds.

11. The process as set forth in claim 10 including forcing said incoming contaminate water through said nanofiltration membrane with a membrane pump.

12. The process as set forth in claim 10 wherein said atmospheric bed is an ion exchange vessel with plastic beads having a strong base resin for ion exchange.

13. The process as set forth in claim 12 wherein said plastic beads are polystyrene crosslinked with divinyl benzene.

14. The process as set forth in claim 10 wherein said nanofiltration membrane is a polyamide thin film composite.

15. The process as set forth in claim 10 wherein a level is maintained in the ion exchange vessel by controlling the speed of a variable speed bed pump.

16. The process as set forth in claim 10 wherein said retentate liquid rejected from said nanofiltration membrane is directed through a vessel containing steel wool maintained at neutral to alkaline pH to remove chrome.

17. The process as set forth in claim 10 including a lower well screen collector juxtaposed between said resin and said gravel layer.

18. The process as set forth in claim 10 wherein permeate liquid is directed through a vessel containing steel wool maintained at neutral to alkaline pH to remove chrome.

19. The process as set forth in claim 1 wherein regeneration of said ion exchange resin includes backwashing said resin in a closed loop fashion by circulating the permeate liquid between said resin bed and a potassium chloride rock salt tank.

20. The process as set forth in claim 10 wherein regeneration of said ion exchange resin in the first and second beds comprises backwashing said resin in a closed loop fashion by circulating the permeate liquid between said first or second beds and a potassium chloride rock salt tank.

\* \* \* \* \*